United States Patent
Koo et al.

(10) Patent No.: US 11,888,151 B2
(45) Date of Patent: Jan. 30, 2024

(54) METHOD OF PREPARING POSITIVE ELECTRODE

(71) Applicant: LG Chem, Ltd., Seoul (KR)

(72) Inventors: Chang Wan Koo, Daejeon (KR); Ki Tae Kim, Daejeon (KR); Sang Hoon Choy, Daejeon (KR)

(73) Assignee: LG Energy Solution, Ltd.

( * ) Notice: Subject to any disclaimer, the term of this patent is extended or adjusted under 35 U.S.C. 154(b) by 75 days.

(21) Appl. No.: 16/980,037

(22) PCT Filed: Mar. 14, 2019

(86) PCT No.: PCT/KR2019/002985
§ 371 (c)(1),
(2) Date: Sep. 11, 2020

(87) PCT Pub. No.: WO2019/177402
PCT Pub. Date: Sep. 19, 2019

(65) Prior Publication Data
US 2021/0013487 A1  Jan. 14, 2021

(30) Foreign Application Priority Data

Mar. 14, 2018  (KR) ........................ 10-2018-0029934

(51) Int. Cl.
| | |
|---|---|
| H01M 4/04 | (2006.01) |
| H01M 4/139 | (2010.01) |
| H01M 4/36 | (2006.01) |
| H01M 4/62 | (2006.01) |
| H01M 10/0525 | (2010.01) |
| H01M 10/056 | (2010.01) |
| H01M 4/02 | (2006.01) |

(52) U.S. Cl.
CPC ........... *H01M 4/139* (2013.01); *H01M 4/043* (2013.01); *H01M 4/0404* (2013.01); *H01M 4/362* (2013.01); *H01M 4/62* (2013.01); *H01M 10/056* (2013.01); *H01M 10/0525* (2013.01); *H01M 2004/021* (2013.01); *H01M 2004/028* (2013.01); *H01M 2300/0082* (2013.01); *H01M 2300/0091* (2013.01)

(58) Field of Classification Search
CPC .................................................. H01M 4/139
See application file for complete search history.

(56) References Cited

U.S. PATENT DOCUMENTS

| | | | | |
|---|---|---|---|---|
| 5,350,646 | A * | 9/1994 | Armand | H01B 1/122 |
| | | | | 429/315 |
| 6,645,675 | B1 | 11/2003 | Munshi | |
| 8,815,443 | B2 | 8/2014 | Mitchell et al. | |
| 2002/0136948 | A1 * | 9/2002 | Missling | H01M 4/0483 |
| | | | | 252/182.1 |
| 2003/0205835 | A1 | 11/2003 | Eastin et al. | |
| 2003/0215710 | A1 | 11/2003 | Lavoie et al. | |
| 2005/0266298 | A1 | 12/2005 | Mitchell et al. | |
| 2008/0206446 | A1 | 8/2008 | Mitchell | |
| 2013/0309414 | A1 | 11/2013 | Eskra et al. | |
| 2015/0061176 | A1 * | 3/2015 | Bruckner | H01M 4/139 |
| | | | | 264/105 |
| 2015/0325844 | A1 | 11/2015 | Inoue | |
| 2016/0006075 | A1 | 1/2016 | Tabuchi et al. | |
| 2017/0098826 | A1 | 4/2017 | Mitchell | |
| 2018/0159169 | A1 | 6/2018 | Ko et al. | |
| 2018/0316043 | A1 | 11/2018 | Jung et al. | |
| 2018/0323469 | A1 * | 11/2018 | Lim | H01M 4/043 |
| 2019/0165357 | A1 * | 5/2019 | Senoue | H01M 4/1395 |
| 2019/0198870 | A1 * | 6/2019 | Watano | H01M 4/587 |
| 2020/0152987 | A1 | 5/2020 | Mitchell | |

FOREIGN PATENT DOCUMENTS

| | | |
|---|---|---|
| CN | 1331847 A | 1/2002 |
| CN | 1372705 A | 10/2002 |
| CN | 102569719 A | 7/2012 |
| CN | 104170125 A | 11/2014 |
| JP | 2012099315 A | 5/2012 |
| JP | 2014143133 A | 8/2014 |
| JP | 2014194929 A | 10/2014 |
| JP | 2015146240 A | 8/2015 |
| JP | 2016062708 A | 4/2016 |
| KR | 20160044951 A | 4/2016 |
| KR | 101671664 B1 | 11/2016 |
| KR | 101681297 B1 | 12/2016 |
| KR | 20170051324 A | 5/2017 |
| KR | 20170084450 A | 7/2017 |
| WO | 0038262 A1 | 6/2000 |

OTHER PUBLICATIONS

International Search Report for Application No. PCT/KR2019/002985, dated Jul. 3, 2019, pp. 1-2.
Extended European Search Report including Written Opinion for Application No. 19767488.0 dated Mar. 24, 2021, pp. 1-7.

* cited by examiner

*Primary Examiner* — Austin Murata
(74) *Attorney, Agent, or Firm* — Lerner David LLP

(57) ABSTRACT

The present invention relates to a method of preparing a positive electrode which includes forming a solid electrolyte by mixing a lithium salt and a polymer for a solid electrolyte in a dry atmosphere, forming a dry mixture by stirring after adding a conductive agent and a positive electrode active material to the solid electrolyte in a dry atmosphere, and pressing after coating a current collector with the dry mixture.

9 Claims, No Drawings

METHOD OF PREPARING POSITIVE ELECTRODE

CROSS-REFERENCE TO RELATED APPLICATIONS

The present application is a national phase entry under 35 U.S.C. § 371 of International Application No. PCT/KR2019/002985, filed on Mar. 14, 2019, which claims the benefit of Korean Patent Application No. 10-2018-0029934, filed on Mar. 14, 2018, the disclosures of which are incorporated herein in their entirety by reference.

TECHNICAL FIELD

The present invention relates to a method of preparing a positive electrode, wherein the method of preparing a positive electrode may specifically include forming a solid electrolyte by mixing a lithium salt and a polymer for a solid electrolyte in a dry atmosphere; forming a dry mixture by stirring after adding a conductive agent and a positive electrode active material to the solid electrolyte in a dry atmosphere; and pressing after coating a current collector with the dry mixture.

BACKGROUND ART

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, i.e., high capacity, have been subjected to considerable research and have been commercialized and widely used.

In general, a secondary battery is composed of a positive electrode, a negative electrode, an electrolyte, and a separator. Among them, the positive electrode may include a positive electrode active material and a conductive agent. The conductive agent may play a role in reducing resistance by increasing electrical conductivity of the positive electrode.

An organic electrolyte solution having high energy density has been used as the electrolyte, but, since initial stability of the organic electrolyte solution becomes problematic, a solid electrolyte replacing the organic electrolyte solution has attracted attention. The solid electrolyte is added in a solution state to an electrode slurry so that the solid electrolyte may be included in an electrode, particularly, an active material layer when the electrode slurry is dried.

However, in a case in which a solvent is used and the solid electrolyte is mixed with the solvent to be added in a solution state to the electrode slurry (wet process), a solid content of the electrode slurry is reduced. Also, it is desirable to increase drying temperature for productivity during the drying of the electrode slurry, but, since crystallization of the solid electrolyte occurs and unintended voids are formed in the active material layer when the drying is performed at a high temperature, there is a limitation in that mechanical stability and energy density may be reduced. Furthermore, porosity of the active material layer included in the prepared electrode must be small in order to increase the energy density, but, in the case that the solid electrolyte is included in the electrode slurry by using the solvent, there is a limitation in that the porosity may not be reduced to a predetermined level or less only by a conventional pressing process.

In general, when a composition for forming an electrode, which includes a solid electrolyte, is prepared, the composition is prepared in a slurry state by using a separate solvent. However, since the solvent is present, a thickness of an active material layer is excessively reduced in a slurry drying process and the preparation of the active material layer having a uniform thickness is difficult. Also, since it is very difficult to increase a solid content of the slurry to a predetermined level or more in consideration of viscosity suitable for an electrode preparation process, productivity may be reduced.

Thus, there is a need for a new method of preparing an electrode which may address the above-described limitations that arise with the use of the solvent.

DISCLOSURE OF THE INVENTION

Technical Problem

An aspect of the present invention provides a method of preparing a positive electrode in which productivity and safety may be improved because a slurry for preparing a positive electrode includes a solid electrolyte but does not include a solvent.

Technical Solution

According to an aspect of the present invention, there is provided a method of preparing a positive electrode which includes forming a solid electrolyte by mixing a lithium salt and a polymer for a solid electrolyte in a dry atmosphere; forming a dry mixture by stirring after adding a conductive agent and a positive electrode active material to the solid electrolyte in a dry atmosphere; and pressing after coating a current collector with the dry mixture.

Advantageous Effects

According to a method of preparing a positive electrode according to an embodiment of the present invention, since a solid electrolyte, which is in a solid state rather than a solution state, is mixed with a positive electrode active material and a conductive agent to form a dry mixture and thereafter, a separate solvent is not added to the dry mixture, it is possible to prepare a positive electrode in a dry atmosphere (solvent-free state). Accordingly, since porosity of the prepared positive electrode is low, energy density of the positive electrode may be improved. Also, productivity is improved, because a positive electrode slurry having a limit in solid content may not be used and a separate drying process is not necessary during the preparation process, and, since a toxic solvent is not used, process safety may be improved.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

In the present specification, the expression "average particle diameter (D50)" denotes a particle diameter at a cumulative volume of 50% in a particle size distribution curve, and the average particle diameter ($D_{50}$), for example, may be measured by a laser diffraction method. The laser diffraction method may generally measure a particle diameter ranging from a submicron level to a few mm and may obtain highly repeatable and high-resolution results.

In the present specification, the expression "dry atmosphere" denotes a process atmosphere in which a solvent is not used, and specifically denotes that a solvent is not used during the preparation of a positive electrode.

A method of preparing a positive electrode according to an embodiment of the present invention may include:

forming a solid electrolyte by mixing a lithium salt and a polymer for a solid electrolyte in a dry atmosphere; forming a dry mixture by stirring after adding a conductive agent and a positive electrode active material to the solid electrolyte in a dry atmosphere; and pressing after coating a current collector with the dry mixture.

In the forming of the solid electrolyte, since lithium ions may be dissociated from the lithium salt, the lithium ions may be a medium of ionic conduction in the subsequently prepared positive electrode.

In the forming of the solid electrolyte, the polymer for a solid electrolyte and the lithium salt may be mixed in a dry atmosphere. That is, the polymer for a solid electrolyte and the lithium salt may be mixed in a state in which a solvent is not used.

The polymer for a solid electrolyte is coagulated with the positive electrode active material and the conductive agent to contribute to the formation of granules.

The polymer for a solid electrolyte may include at least one selected from the group consisting of polyethylene oxide (PEO), polyacrylonitrile, carboxymethyl cellulose (CMC), polyvinylidene fluoride (PVdF), and styrene-butadiene rubber (SBR), and may specifically be polyethylene oxide. In a case in which the above-described polymer for a solid electrolyte is used, the granules may be easily formed. Also, since a size of the granules formed may be controlled to an appropriate level, a loading amount and a thickness of the positive electrode active material layer may be uniform.

The polymer for a solid electrolyte may have a weight-average molecular weight of 10,000 g/mol to 1,000,000 g/mol, particularly 20,000 g/mol to 500,000 g/mol, and more particularly 30,000 g/mol to 200,000 g/mol. In a case in which the weight-average molecular weight of the polymer for a solid electrolyte satisfies the above range, since the polymer for a solid electrolyte may be coagulated with the positive electrode active material and the conductive agent to easily form the granules, non-coagulated components may be reduced. Accordingly, the loading amount and thickness of the positive electrode active material layer may be uniform.

The lithium salt may include at least one selected from the group consisting of lithium bis(trifluoromethanesulfonyl) imide (LiTFSI), lithium hexafluorophosphate ($LiPF_6$), lithium bis(fluorosulfonyl)imide (LiFSI), lithium tetrafluoroborate ($LiBF_4$), and lithium perchlorate (LiClO4). The lithium salt is suitable for the present invention in terms of the fact that it is easily used as a solid phase. Specifically, the lithium salt may be LiTFSI.

The lithium salt may have an average particle diameter ($D_{50}$) of 1 μm to 100 μm, particularly 2 μm to 50 μm, and more particularly 5 μm to 20 μm. In a case in which the average particle diameter satisfies the above range, since uniform-sized granules may be formed, the loading amount and thickness of the positive electrode active material layer may be uniform.

In the forming of the solid electrolyte, the polymer for a solid electrolyte and the lithium salt may be mixed in a weight ratio of 5:95 to 50:50, may be particularly mixed in a weight ratio of 10:90 to 30:70, and may be more particularly mixed in a weight ratio of 15:85 to 20:80. In a case in which the weight ratio satisfies the above range, ionic conductivity of the positive electrode prepared may be further improved.

In the forming of the solid electrolyte, the mixing of the polymer for a solid electrolyte and the lithium salt may be performed using a twin screw mixer. In a case in which the twin screw mixer is used, since a high shear force may be applied to the polymer for a solid electrolyte and the lithium salt, the mixing of the polymer for a solid electrolyte and the lithium salt may be more uniformly performed and the polymer for a solid electrolyte and the lithium salt may be coagulated. Also, the lithium ions may be more easily dissociated from the lithium salt.

In the forming of the dry mixture, stirring may be performed after adding the conductive agent and the positive electrode active material to the solid electrolyte in a dry atmosphere.

The conductive agent may provide conductivity to the positive electrode. The conductive agent may include graphite such as natural graphite or artificial graphite; a carbon-based material such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxide such as titanium oxide; or conductive polymers such as polyphenylene derivatives, and any one thereof or a mixture of two or more thereof may be used.

The positive electrode active material may be a commonly used positive electrode active material. Specifically, the positive electrode active material may include at least one selected from the group consisting of a layered compound, such as lithium cobalt oxide ($LiCoO_2$) or lithium nickel oxide ($LiNiO_2$), or a compound substituted with one or more transition metals; lithium iron oxides such as $LiFe_3O_4$; lithium manganese oxides such as $Li_{1+a1}Mn_{2-a1}O_4$ (0≤a1≤0.33), $LiMnO_3$, $LiMn_2O_3$, and $LiMnO_2$; lithium copper oxide ($Li_2CuO_2$); vanadium oxides such as $LiV_3O_3$, $V_2O_5$, and $Cu_2V_2O_7$; nickel (Ni)-site type lithium nickel oxide expressed by a chemical formula of $LiNi_{1-a2}M_{a2}O_2$ including $Li[Ni_{0.6}Mn_{0.2}Co_{0.2}]O_2$ or $Li[Ni_{0.5}Mn_{0.3}Co_{0.2}]O_2$ (where M is at least one selected from the group consisting of cobalt (Co), manganese (Mn), aluminum (Al), copper (Cu), iron (Fe), magnesium (Mg), boron (B), and gallium (Ga), and a2 satisfies 0.01≤a2≤0.5); lithium manganese composite oxide expressed by a chemical formula of $LiMn_{2-a3}M_{a3}O_2$ (where M is at least one selected from the group consisting of Co, Ni, Fe, chromium (Cr), zinc (Zn), and tantalum (Ta), and a3 satisfies 0.01≤a3≤0.1) or $Li_2Mn_3MO_8$ (where M is at least one selected from the group consisting of Fe, Co, Ni, Cu, and Zn); and $LiMn_2O_4$ having a part of lithium (Li) being substituted with alkaline earth metal ions. More specifically, the positive electrode active material may include $Li[Ni_xMn_yCo_z]O_2$ (0.38<x<0.84, 0.08<y<0.31, 0.08<z<0.31).

In the forming of the dry mixture, the solid electrolyte may be included in an amount of 5 wt % to 50 wt % in the dry mixture, may be particularly included in an amount of 10 wt % to 40 wt %, and may be more particularly included in an amount of 20 wt % to 35 wt %. In a case in which the amount of the solid electrolyte satisfies the above range, an excessive decrease in flexibility of the positive electrode may be prevented.

The dry mixture may include the granules which are formed by the coagulation of the solid electrolyte, the positive electrode active material, and the conductive agent. Since the granules have good flowability, the loading amount and thickness of the positive electrode active material layer, which is formed when the dry mixture is applied and coated on the current collector, may be uniform.

The granules may have an average particle diameter ($D_{50}$) of 20 μm to 500 μm, particularly 45 μm to 300 μm, and more particularly 50 μm to 200 μm. In a case in which the average particle diameter of the granules satisfies the above range, since the flowability of the granules may be further improved, the loading amount and thickness of the positive electrode active material layer may be more uniform.

The stirring may be performed in a dry atmosphere in which a solvent is not used. In the present invention, since the solid electrolyte is not used in a solution state by being added to a solvent and a solvent is not used even during the stirring of the positive electrode active material, the conductive agent, and the solid electrolyte, the solvent may not be used in the entire process. Accordingly, since porosity of the prepared positive electrode is lower than a normal level, energy density of the positive electrode may be improved. Also, the preparation process may not be affected by a solid content of a positive electrode slurry and a separate drying process is not necessary, productivity may be improved. Furthermore, a toxic solvent, for example, acetonitrile (AN), must be used depending on a type of the solid electrolyte in a conventional process using a solvent, but, since the toxic solvent may not be used in the present invention, process safety may be improved.

The stirring, for example, may be performed at 300 rpm to 1,000 rpm for 0.2 hr to 1.0 hr at 20° C. or less using a stirring device.

In some cases, in the forming of the dry mixture, the stirring may be performed using a twin screw mixer. In a case in which the twin screw mixer is used, since a high shear force may be applied to the dry mixture, the solid electrolyte, the conductive agent, and the positive electrode active material may be uniformly dispersed and mixed.

Accordingly, energy density may be uniformly formed in the positive electrode active material layer.

The dry mixture may be coated on a current collector and may then be rolled.

The current collector is not particularly limited as long as it has conductivity without causing adverse chemical changes in a battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The current collector may be used in various shapes such as that of a film, a sheet, a foil, a net, a porous body, a foam body, a non-woven fabric body, and the like, but the present invention is not limited thereto.

The coating may be performed in the following manner, but is not necessarily limited thereto. Specifically, the dry mixture may be disposed to a uniform thickness on the current collector by a scattering method. More specifically, when the scattering method is used, the mixture is transferred by a feeding roller, and, when the dry mixture is coated on the current collector, a fixed amount of the dry mixture may be coated using a squeeze roll.

The dry mixture in a powder state is disposed on the current collector, and the dry mixture is not disposed on the current collector after it is prepared in a film state. Since the dry mixture in a powder state may be disposed on the current collector, a contact between the current collector and the dry mixture may be increased in comparison to a case where the dry mixture is disposed in the form of a film, and accordingly, positive electrode adhesion may be further improved.

The dry mixture may be disposed on one surface or both surfaces of the current collector. In order to dispose the dry mixture on both surfaces, after one surface of the current collector is coated with the dry mixture and then pressed to form a positive electrode active material layer on the one surface, the dry mixture may be disposed on the other surface.

The dry mixture disposed on the current collector may be formed into a positive electrode active material layer through a pressing process. Specifically, the positive electrode active material layer may be formed by pressing the current collector having the dry mixture disposed thereon, and the pressing may apply spinning to the dry mixture. In a case in which the spinning is applied, since the pressing is possible even with a smaller force than a case where surface pressure is applied, processability may be improved.

The pressing may include rolling the current collector having the dry mixture disposed thereon through rolls. Specifically, in a state in which two rolls are disposed on top and bottom of the current collector having the dry mixture disposed thereon, the roll press method includes applying a pressure to the current collector having the dry mixture disposed thereon with the rolls and simultaneously moving the current collector having the dry mixture disposed thereon in a horizontal direction.

Through the pressing process, a porosity of the positive electrode active material layer may be in a range of 3.5% to 18%. When the porosity is satisfied, positive electrode conductivity may be improved and a thickness of the positive electrode may be appropriate. The porosity may be calculated by the following Equation 1.

Positive electrode active material layer density (g/cm)=positive electrode active material layer weight/(positive electrode thickness before pressing−current collector thickness)

Porosity(%)=1−(positive electrode active material layer density/true density of the positive electrode active material layer)  [Equation 1]

The above porosity range is difficult to be obtained by a conventional method of preparing a positive electrode which uses a solvent. Specifically, when the solvent is used, an area where the solvent is located may become a large pore due to the removal of the solvent in a drying process. Accordingly, since a thickness of the positive electrode, from which the solvent is removed, is excessively large, the pressing process must be performed several times in order to reduce the thickness and the porosity. Thus, processability for preparing the positive electrode is reduced. In contrast, since the solvent is not used in the present invention, the area itself where the solvent is located does not exist, and thus, the porosity range may be satisfied even if the pressing process is not performed several times.

Specifically, according to the method of preparing a positive electrode of the present invention, a porosity of 3.5% to 18% may be satisfied even if the number of pressing processes is ten or less.

A method of preparing a positive electrode according to another embodiment of the present invention is similar to the above-described method of preparing a positive electrode according to the embodiment, but there is a difference in that the method of preparing a positive electrode according to another embodiment of the present invention further includes applying a shear force of 20 N to 500 N to the dry mixture. Thus, the difference will be described.

The applying of the shear force may be performed before coating the current collector, after the forming of the dry mixture. The applying of the shear force may include applying a shear force by shearing the dry mixture. Specifically, in a case in which a device for applying a shear force, for example, Nobilta (Hosokawa Micron Ltd.) or a twin screw extruder (Thermo KA) is used, the shear force may be applied by shearing the dry mixture with a blade in the device. However, the present invention is not necessarily limited to such a method. In a case in which the shear force is applied to the dry mixture, the polymer for a solid electrolyte in the dry mixture may be entangled each other. Thus, since the positive electrode active material and the conductive agent may be supported by the polymer for a solid electrolyte, a binding force between the positive electrode active material, the conductive agent, and the polymer for a solid electrolyte may be increased. Accordingly, the process of disposing the dry mixture on the current collector may be facilitated, and adhesion of the prepared positive electrode active material layer may be further improved.

The shear force may be in a range of 20 N to 500 N, and may specifically be in a range of 25 N to 300 N. In a case in which the shear force satisfies the above range, the entanglement of the polymer for a solid electrolyte may smoothly occur. Also, when considering an aspect of maintaining a length of the polymer for a solid electrolyte, the shear force may preferably be in a range of 50 N to 150 N.

A method of preparing a positive electrode according to another embodiment of the present invention is similar to the above-described method of preparing a positive electrode according to the embodiment, but there is a difference in that, when a pressing roll is used in the pressing, the roll is in a high-temperature state. Thus, the difference will be described.

During the pressing, a temperature of the roll may be in a range of 10° C. to 60° C., particularly 10° C. to 40° C., and more particularly 25° C. to 40° C. The temperature of the roll is an optimum temperature in consideration of the polymer for a solid electrolyte. In a case in which the temperature of the roll is less than 10° C., since the polymer for a solid electrolyte is not thermally melted properly, the positive electrode active material layer is not smoothly adhered to the current collector. In contrast, in a case in which the temperature of the roll is greater than 60° C., since the thermally melted polymer for a solid electrolyte becomes excessively stiff after the pressing, the flexibility of the positive electrode is reduced, and thus, cycle characteristics and safety of the battery may be degraded.

A positive electrode according to another embodiment of the present invention may be a positive electrode which is prepared by the method of preparing a positive electrode of the above-described embodiment.

A secondary battery according to another embodiment of the present invention may include a positive electrode, a negative electrode, and a separator disposed between the positive electrode and the negative electrode. Herein, the positive electrode is the same as the positive electrode of the above-described embodiment.

The negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a negative electrode binder and a negative electrode conductive agent as well as a negative electrode active material. The negative electrode active material layer, for example, may be prepared by coating a composition for forming a negative electrode, which selectively includes the negative electrode binder and the negative electrode conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x(0<x<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly acrylic acid, and a material having hydrogen thereof substituted with lithium (Li), sodium (Na), or calcium (Ca), or may include various copolymers thereof.

The negative electrode conductive agent is not particularly limited as long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. The carbon fibers may be vapor grown carbon fibers (VGCF).

The separator separates the negative electrode and the positive electrode and provides a movement path of lithium ions, wherein any separator may be used as the separator without particular limitation as long as it is typically used in a lithium secondary battery. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES AND COMPARATIVE EXAMPLES

Example 1: Preparation of Positive Electrode (1) Formation of Solid Electrolyte

LiTFSI having an average particle diameter ($D_{50}$) of 5 μm was used as a lithium salt, and PEO having a weight-average molecular weight of 100,000 g/mol was used as a polymer for a solid electrolyte.

80 g of the lithium salt and 20 g of the polymer for a solid electrolyte were mixed while applying a shear force of 100 N for 0.5 hours using a twin screw mixer (RS3000). Accordingly, a solid electrolyte was formed.

(2) Preparation of Positive Electrode $Li[Ni_{0.6}Mn_{0.2}Co_{0.2}]O_2$ having an average particle diameter ($D_{50}$) of 15 μm was used as a positive electrode active material and VGCFs having an average particle diameter ($D_{50}$) of 3 μm were used as a conductive agent. After adding 1.5 g of the conductive agent to 28.95 g of the solid electrolyte, 69.55 g of the positive electrode active material was subsequently added thereto to obtain a mixture. Thereafter, a dry mixture was prepared by applying a shear force of 100 N to the mixture for 1.0 hour using a twin screw mixer (RS3000). The dry mixture was coagulated in a stirring process to be in the form of granules having an average particle diameter ($D_{50}$) of 100 μm.

A preliminary positive electrode was prepared by disposing the dry mixture on one surface of an aluminum current collector having a thickness of 15 μm using a scattering method. The preliminary positive electrode was disposed on a belt of a roll press machine, and, subsequently, the preliminary positive electrode was rolled(pressed) ten times at a speed of 0.5 m/min using a roll at 23° C. to prepare a positive electrode of Example 1 including a positive electrode active material layer. A loading amount of the positive electrode active material layer was 40 mg/cm$^2$.

Example 2: Preparation of Positive Electrode

A positive electrode of Example 2 was prepared in the same manner as in Example 1 except that, similar to Example 1, but the temperature of the roll of the roll press was 40° C. and rolling was performed three times.

Example 3: Preparation of Positive Electrode

A positive electrode of Example 3 was prepared in the same manner as in Example 1 except that a shear force of 200 N was applied to the mixture of the solid electrolyte, the conductive agent, and the positive electrode active material using a twin screw mixer during the preparation of the dry mixture in Example 1.

Example 4: Preparation of Positive Electrode

A positive electrode of Example 4 was prepared in the same manner as in Example 1 except that the mixture of the solid electrolyte, the conductive agent, and the positive electrode active material was mixed (100 rpm) using an automatic mortar mixing machine (ALM-50, Nitto Kagaku, Co, Ltd.) during the preparation of the dry mixture in Example 1.

Example 5: Preparation of Positive Electrode

A positive electrode of Example 5 was prepared in the same manner as in Example 1 except that 70 g of the lithium salt and 30 g of the polymer for a solid electrolyte were mixed while applying a shear force of 100 N for 0.5 hours using a twin screw mixer during the preparation of the solid electrolyte in Example 1.

Comparative Example 1: Preparation of Positive Electrode (1) Electrolyte Solution Preparation LiTFSI having an average particle diameter ($D_{50}$) of 5 pm was used as a lithium salt, and PEO having a weight-average molecular weight of 100,000 g/mol was used as a polymer for a solid electrolyte.

81 g of the lithium salt and 19 g of the polymer for a solid electrolyte were added to 150 g of xylene and then mixed at 25° C. for 24 hours using a homogenizer mixer. Accordingly, an electrolyte solution was formed.

(2) Preparation of Positive Electrode Slurry

Li[Ni$_{0.6}$Mn0.2Co$_{0.2}$]O$_2$ having an average particle diameter ($D_{50}$) of 15 μm was used as a positive electrode active material, VGCFs having an average diameter (D50) of 3 μm were used as a conductive agent, and acetonitrile was used as a solvent for a positive electrode slurry. 1.5 g of the conductive agent was added to 28.95 g of the electrolyte solution and stirring was performed at 1,000 rpm for 0.2 hours using a homogenizer mixer. Thereafter, 20 g of acetonitrile was added to the electrolyte solution containing the conductive agent and stirring was then performed at 1,000 rpm for 0.2 hours using a homogenizer mixer to form a mixture. Subsequently, 69.55 g of the positive electrode active material was added to the mixture and stirring was performed at 1,000 rpm for 0.2 hours using a homogenizer mixer.

Thereafter, 40 g of acetonitrile was added to the mixture containing the positive electrode active material and stirring was then performed at 1,000 rpm for 0.2 hours using a homogenizer mixer to prepare a positive electrode slurry.

(3) Preparation of Positive Electrode

The positive electrode slurry was coated on one surface of an aluminum current collector having a thickness of 15 μm with a loading of 40 mg/cm$^2$ and then dried. The drying in this case was performed in a convection oven at 25° C. for 24 hours. Subsequently, the current collector, on which the positive electrode slurry was coated and dried, was rolled through rolls at room temperature and dried in a vacuum oven at 25° C. for 48 hours to prepare a positive electrode of Comparative Example 1. In this case, a loading amount of the positive electrode active material layer was 40 mg/cm$^2$.

Experimental Example 1: Evaluation of Positive Electrode Adhesion

After each of the positive electrodes of Examples 1 to 5 and Comparative Example 1 was punched into a size of 20 mm×150 mm and fixed to the center of a 25 mm×75 mm slide glass using a tape, 90 degree peel strength was measured while peeling the current collector using a universal testing machine (UTM). Evaluation was made by measuring peel strengths of the 5 or more punched samples and calculating an average value. The results thereof are presented in Table 1 below.

Experimental Example 2: Thickness Variation of Positive Electrode

For each of the positive electrodes of Examples 1 to 5 and Comparative Example 1, after thicknesses of a portion of the positive electrode and other portions (5 places) spaced 10 mm apart from the portion were measured by applying a force of 1.0 N using a 5 mm tip (thickness measurement standard: 100 mm), thickness variation was calculated as an average of differences between the thickness of the portion and the thicknesses of the other portions, and the results thereof are presented in Table 1 below.

Experimental Example 3: Porosity Evaluation

Porosity was evaluated for each of the positive electrodes of Examples 1 to 5 and Comparative Example 1 by the following method and the results thereof are presented in Table 1 below.

Positive electrode active material layer density (g/cm)=positive electrode active material layer weight/(positive electrode thickness before rolling−current collector thickness)

Porosity(%)=1−(positive electrode active material layer density/true density of the positive electrode active material layer)

TABLE 1

|  | Positive electrode adhesion (gf/20 mm) | Thickness variation of positive electrode (μm) | Porosity (%) |
| --- | --- | --- | --- |
| Example 1 | 23 | 6 | 10 |
| Example 2 | 20 | 4 | 6 |
| Example 3 | 20 | 7 | 12 |
| Example 4 | 11 | 8 | 17 |
| Example 5 | 15 | 8 | 16 |
| Comparative Example 1 | 15 | 12 | 22 |

Referring to Table 1, it may be understood that the positive electrodes of Examples 1 to 5 prepared by the dry process of the present invention had lower thickness variations and porosities than the positive electrode of Comparative Example 1 prepared by the wet process. When Example 1 and Example 2 were compared, it may be understood that the thickness variation and porosity of the positive electrode were more improved when the temperature of the roll was set to 40° C.

When Example 1 and Example 3 were compared, it may be understood that the positive electrode adhesion and the thickness variation and porosity of the positive electrode may all be improved when an appropriate level of shear force of about 100 N was applied during the preparation of the dry mixture.

When Example 1 and Example 4 were compared, it may be understood that the positive electrode adhesion and the thickness variation and porosity of the positive electrode may all be improved when the shear force was applied by using the twin screw mixer.

When Example 1 and Example 5 were compared, it may be understood that the positive electrode adhesion and the thickness variation and porosity of the positive electrode may all be improved when a ratio of the lithium salt to the polymer for a solid electrolyte was at a reasonable level of 80:20.

Experimental Example 4: Discharge Capacity and Initial Efficiency Evaluation

After secondary batteries were prepared by the following method using the positive electrodes of Examples 1 to 5 and Comparative Example 1, discharge capacity and initial efficiency were evaluated, and the results thereof are presented in Table 2 below.

(1) Preparation of Negative Electrode

Natural graphite as a negative electrode active material, a carbon black conductive agent, and a PVdF binder were mixed in an N-methylpyrrolidone solvent in a weight ratio of 85:10:5 to prepare a composition for forming a negative electrode, and a cooper current collector was coated with the composition to prepare a negative electrode.

(2) Preparation of Secondary Battery

An electrode assembly was prepared by disposing a porous polyethylene separator between the negative electrode and each of the positive electrodes prepared in Examples 1 to and Comparative Example 1, the electrode assembly was disposed in a case, and an electrolyte solution was then injected into the case to prepare a lithium secondary battery. In this case, the electrolyte solution was prepared by dissolving 1.0 M lithium hexafluorophosphate ($LiPF_6$) in an organic solvent composed of ethylene carbonate/dimethyl carbonate/ethyl methyl carbonate (mixing volume ratio of EC/DMC/EMC=3/4/3). Accordingly, each secondary battery was prepared.

(3) Discharge Capacity and Initial Efficiency Evaluation

The secondary batteries were charged and discharged under the following conditions to evaluate discharge capacities and initial efficiencies.

Charge condition: charged at a constant current of 0.05 C to 4.25 V, and thereafter, at 0.05 C current rate, charged at a constant voltage to a current of 5% of the constant current value Discharge condition: discharged at 0.05 C rate to 3.0 V Initial efficiency(%)=(discharge capacity after first discharge/first charge capacity)×100

TABLE 2

|  | Discharge capacity (mAh/g) | Initial efficiency (%) |
| --- | --- | --- |
| Example 1 | 163 | 80 |
| Example 2 | 171 | 85 |
| Example 3 | 161 | 63 |
| Example 4 | 140 | 55 |
| Example 5 | 151 | 64 |

TABLE 2-continued

|  | Discharge capacity (mAh/g) | Initial efficiency (%) |
| --- | --- | --- |
| Comparative Example 1 | 105 | 40 |

Referring to Table 2, with respect to the secondary batteries including the positive electrodes of Examples 1 to 5 prepared by the dry process of the present invention, it may be understood that discharge capacities and initial efficiencies were higher than those of the secondary batteries including the positive electrode of Comparative Examples 1 prepared by the wet process.

The invention claimed is:

1. A method of preparing a positive electrode, the method comprising:
   mixing a lithium salt and a polymer in a dry atmosphere to form a solid electrolyte which is in a solid state;
   forming a dry mixture by stirring after adding a conductive agent and a positive electrode active material to the solid electrolyte in a dry atmosphere; and
   pressing after coating a current collector with the dry mixture,
   wherein the dry mixture comprises granules formed by coagulation of the solid electrolyte, the positive electrode active material, and the conductive agent.

2. The method of claim 1, wherein the polymer for a solid electrolyte comprises at least one selected from the group consisting of polyethylene oxide, polyacrylonitrile, carboxymethyl cellulose, polyvinylidene fluoride, and styrene-butadiene rubber.

3. The method of claim 1, wherein the lithium salt comprises at least one selected from the group consisting of lithium bis(trifluoromethanesulfonyl)imide, lithium hexafluorophosphate, lithium bis(fluorosulfonyl)imide, lithium tetrafluoroborate, and lithium perchlorate.

4. The method of claim 1, wherein, in the solid electrolyte, a weight ratio of the polymer for a solid electrolyte to the lithium salt is in a range of 5:95 to 50:50.

5. The method of claim 1, wherein the granules have an average particle diameter ($D_{50}$) of 20 μm to 500 μm.

6. The method of claim 1, wherein, in the forming of the dry mixture, the stirring is performed using a twin screw mixer.

7. The method of claim 1, further comprising applying a shear force of 20 N to 500 N to the dry mixture.

8. The method of claim 1, wherein the pressing comprises rolling the current collector having the dry mixture disposed thereon through rolls.

9. The method of claim 8, wherein a temperature of the roll is in a range of 10° C. to 60° C.

\* \* \* \* \*